(12) United States Patent
Park et al.

(10) Patent No.: US 12,067,593 B2
(45) Date of Patent: Aug. 20, 2024

(54) ADVERTISEMENT TARGET DETERMINING DEVICE AND ADVERTISEMENT TARGET DETERMINING METHOD

(71) Applicant: SAMSUNG ELECTRONICS CO., LTD., Suwon-si (KR)

(72) Inventors: Sanghun Park, Suwon-si (KR); Kunhee Jo, Suwon-si (KR); Seongmin Joe, Suwon-si (KR); Yeongjin Chi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/123,105

(22) Filed: Mar. 17, 2023

(65) Prior Publication Data

US 2023/0325876 A1    Oct. 12, 2023

Related U.S. Application Data

(63) Continuation of application No. PCT/KR2023/003164, filed on Mar. 8, 2023.

(30) Foreign Application Priority Data

Mar. 17, 2022   (KR) .................. 10-2022-0033585

(51) Int. Cl.
  *G06Q 30/00*  (2023.01)
  *G06N 5/04*  (2023.01)
  *G06Q 30/0251*  (2023.01)
(52) U.S. Cl.
  CPC ........... *G06Q 30/0255* (2013.01); *G06N 5/04* (2013.01)

(58) Field of Classification Search
None
See application file for complete search history.

(56) References Cited

U.S. PATENT DOCUMENTS 10,032,452 B1    7/2018  Bhaya et al.
10,284,506 B2    5/2019  Buchheit et al.
(Continued)

FOREIGN PATENT DOCUMENTS

CN    111095330 A    5/2020
CN    113269232 A    8/2021
(Continued)

OTHER PUBLICATIONS

Miralles-Pechuán, Luis, Hiram Ponce, and Lourdes Martínez-Villaseñor. "A novel methodology for optimizing display advertising campaigns using genetic algorithms." Electronic Commerce Research and Applications 27 (2018): 39-51. (Year: 2018).*

(Continued)

*Primary Examiner* — Michael Bekerman
(74) *Attorney, Agent, or Firm* — Sughrue Mion, PLLC

(57) ABSTRACT

Provided is a method of determining an advertisement target according to an advertisement request, the method includes: obtaining usage history information from a plurality of devices, obtaining features of the plurality of devices, based on the usage history information, and generating feature vectors for the obtained features; determining labels for the plurality of devices, based on the advertisement request and the obtained features; generating an advertisement target inference model, based on the determined labels and the feature vectors; and determining at least one advertisement target device among the plurality of devices by applying the generated advertisement target inference model to the plurality of devices.

16 Claims, 14 Drawing Sheets

(56) References Cited

U.S. PATENT DOCUMENTS

| | | |
|---|---|---|
| 11,257,596 B2* | 2/2022 | Cho ................. H04L 67/10 |
| 11,463,772 B1 | 10/2022 | Wanjari et al. |
| 2011/0138064 A1* | 6/2011 | Rieger ............... G06F 16/9577 |
| | | 707/715 |
| 2012/0191815 A1* | 7/2012 | Tabbal ............... G06Q 30/0269 |
| | | 709/218 |
| 2014/0052540 A1 | 2/2014 | Rajaram et al. |
| 2014/0214537 A1 | 7/2014 | Yoo et al. |
| 2018/0324478 A1* | 11/2018 | Maruskin ............ G06F 16/44 |
| 2019/0073660 A1 | 3/2019 | Aung et al. |
| 2023/0004833 A1* | 1/2023 | Sahasi ............... G06Q 30/0282 |

FOREIGN PATENT DOCUMENTS

| | | | | |
|---|---|---|---|---|
| GB | 2558947 A * | 7/2018 | ......... | G06Q 30/0269 |
| JP | 2004-126975 A | 4/2004 | | |
| JP | 2021-89742 A | 6/2021 | | |
| JP | 7012599 B2 | 1/2022 | | |
| KR | 10-2006-0130156 A | 12/2006 | | |
| KR | 10-1171405 B1 | 8/2012 | | |
| KR | 10-1338174 B1 | 12/2013 | | |
| KR | 10-2014-0098947 A | 8/2014 | | |
| KR | 10-2015-0046151 A | 4/2015 | | |
| KR | 10-1712588 B1 | 3/2017 | | |
| KR | 10-2029461 B1 | 10/2019 | | |
| WO | WO-2016151469 A1 * | 9/2016 | | |
| WO | 2019/052869 A1 | 3/2019 | | |

OTHER PUBLICATIONS

Sharma, Avinash, et al. "Classification of Digital Marketing Targeted Data Using Machine Learning Techniques." 2021 IEEE International Conference on Technology, Research, and Innovation for Betterment of Society (TRIBES). IEEE, 2021. (Year: 2021).*
International Search Report and Written Opinion issued Jun. 19, 2023 by the International Searching Authority in counterpart International Patent Application No. PCT/KR2023/003164 (PCT/ISA/220, PCT/ISA/210 and PCT/ISA/237).

* cited by examiner

FIG. 13

ADVERTISEMENT REQUEST

| ADVERTISEMENT SECTOR | CONTENT APPLICATION SECTOR |
|---|---|
| ADVERTISEMENT OBJECT | Xflix APPLICATION |
| ADVERTISEMENT PURPOSE | INCREASE IN NEW USERS |
| ADVERTISEMENT CONDITION | ADVERTISING ON 1 MILLION DEVICES MANUFACTURED AFTER THE YEAR 2018 |

ADVERTISEMENT TARGET DETERMINING DEVICE AND ADVERTISEMENT TARGET DETERMINING METHOD

CROSS-REFERENCE TO RELATED APPLICATIONS

This application is a bypass continuation application of International Application No. PCT/KR2023/003164, filed on Mar. 8, 2023, which claims priority to Korean Patent Application No. 10-2022-0033585 filed on Mar. 17, 2022 in the Korean Intellectual Property Office, the disclosures of which are herein incorporated by reference in their entireties.

TECHNICAL FIELD

Embodiments of the present disclosure relate to an advertisement target determining device and an advertisement target determining method. More particularly, the disclosure relates to an advertisement target determining device and method for automatically determining an advertisement target device that conforms to a request by using usage history information of a plurality of external devices.

BACKGROUND ART

In order to maximize the effectiveness of advertising, it is very important to select an advertisement target well.

To select an advertisement target to satisfy an advertiser's requirements, meaningful information needs to be obtained by precisely analyzing usage history information of many devices, and also there are many factors to consider such as the sectors, purposes, and characteristics of the advertisement, leading to a lot of effort and high costs. Because some processes have to be performed manually by data scientists, this inevitably takes a lot of time and money.

It may be difficult for such an existing advertisement target selection method to satisfy the demands of advertisers who want to quickly and efficiently advertise their products in time and at a low cost.

Accordingly, there is an increasing need to automatize the entire process of analyzing the usage histories of devices and selecting an advertisement target according to an advertisement request.

DESCRIPTION OF EMBODIMENTS

Technical Problem

According to embodiments of the present disclosure, an advertisement target determining device is provided and method for automatically determining an advertisement target device that conforms to a request by using usage history information of a plurality of external devices is provided.

Solution to Problem

According to an aspect of one or more embodiments, there is provided a method of determining an advertisement target based on an advertisement request, the method includes: obtaining usage history information from a plurality of devices, obtaining features of the plurality of devices, based on the usage history information, and generating feature vectors for the obtained features: determining labels for the plurality of devices, based on the advertisement request and the obtained features: generating an advertisement target inference model, based on the determined labels and the feature vectors; and determining at least one advertisement target device among the plurality of devices by applying the generated advertisement target inference model to the plurality of devices.

According to another aspect of one or more embodiments, there is provided a device for determining an advertisement target based on an advertisement request, the device includes: a memory that stores one or more instructions; and a processor configured to execute the one or more instructions that are stored in the memory, to cause the processor to: obtain usage history information from a plurality of devices, obtain features of the plurality of devices, based on the usage history information, and generate feature vectors for the obtained features; determine labels for the plurality of devices, based on the advertisement request and the obtained features: generate an advertisement target inference model, based on the labels and the feature vectors; and determine at least one advertisement target device among the plurality of devices by applying the generated advertisement target inference model to the plurality of devices.

According to yet another aspect of one or more embodiments, there is provided a computer-readable recording medium having recorded thereon instructions executable by at least one processor to perform a method for determining an advertisement target, wherein method includes: obtaining usage history information from a plurality of devices, obtaining features of the plurality of devices, based on the usage history information, and generating feature vectors for the obtained features; determining a label for each of the plurality of devices, based on an advertisement request and the obtained features: generating an advertisement target inference model, based on the labels and the feature vectors: and determining at least one advertisement target device among the plurality of devices by applying the generated advertisement target inference model to the plurality of devices.

Additional aspects will be set forth in part in the description which follows and, in part, will be apparent from the description, or may be learned by practice of the presented embodiments.

BRIEF DESCRIPTION OF DRAWINGS

The above and other aspects and features of certain embodiments of the present disclosure will be more apparent from the following description taken in conjunction with the accompanying drawings, in which:

FIG. 13 is a table showing an example of an advertisement request received by an advertisement target determining device, according to an embodiment.

MODE OF DISCLOSURE

Figure 1:
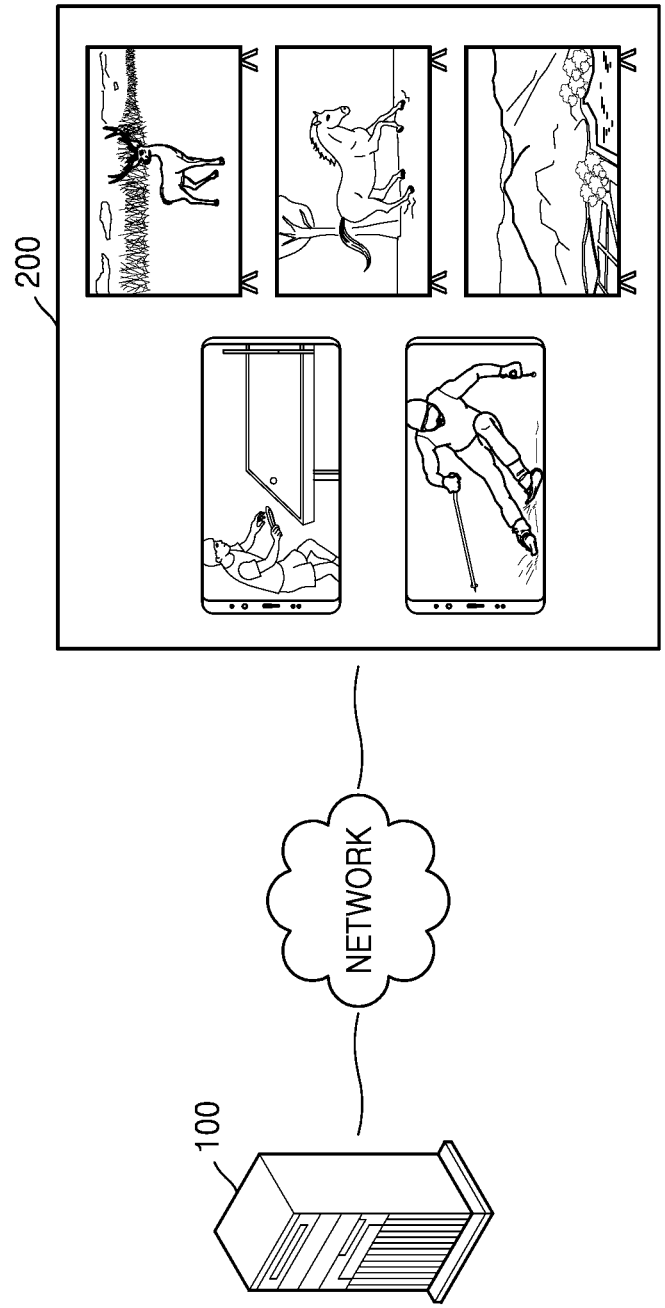
FIG. 1 is a diagram illustrating an advertisement target determining device and a plurality of devices, according to an embodiment.

Throughout the disclosure, the expression "at least one of a, b or c" indicates only a, only b, only c, both a and b, both a and c, both b and c, all of a, b, and c, or variations thereof.

Embodiments of the disclosure are described in detail herein with reference to the accompanying drawings so that this disclosure may be easily performed by one of ordinary skill in the art to which the disclosure pertains. The disclosure may, however, be embodied in many different forms and should not be construed as being limited to the examples set forth herein.

Although general terms widely used at present were selected for describing the disclosure in consideration of the functions thereof, these general terms may vary according to intentions of one of ordinary skill in the art, case precedents, the advent of new technologies, or the like. Hence, the terms are defined based on their meanings and the contents of the entire specification, not by simply stating the terms.

The terms used in the present specification are merely used to describe a particular embodiment, and are not intended to limit the scope of the disclosure.

Throughout the specification, when an element is referred to as being "connected" or "coupled" to another element, it can be directly connected or coupled to the other element, or can be electrically connected or coupled to the other element with intervening elements interposed therebetween.

The use of the terms "a" and "an" and "the" and similar referents in the context of describing the disclosure (especially in the context of the following claims) are to be construed to cover both the singular and the plural. Also, the steps of all methods described herein can be performed in any suitable order unless otherwise indicated herein or otherwise clearly contradicted by context. The disclosure is not limited to the described order of the operations.

Thus, the expression "according to an embodiment" used in the entire disclosure does not necessarily indicate the same embodiment.

An embodiment of the disclosure may be described in terms of functional block components and various processing steps. Some or all of these functional blocks may be implemented using various numbers of hardware and/or software configurations that perform specific functions. For example, the functional blocks of the disclosure may be implemented by one or more microprocessors, or by circuit configurations for a certain function. For example, the functional blocks of the disclosure may be implemented in various programming or scripting languages. The functional blocks may be implemented as algorithms executed in one or more processors. The disclosure may employ the conventional art for electronic configuration, signal processing, and/or data processing, for example. The words "mechanism," "element," "means," and "configuration" are used broadly and are not limited to mechanical or physical configurations.

Furthermore, the connecting lines or connectors between components shown in the various figures presented are intended to represent exemplary functional relationships and/or physical or logical couplings between the components. In an actual device, a connection between components may be represented by various functional connections, physical connections, or circuit connections that are replaceable or added.

The terms "unit", "-er (-or)", and "module" when used in this specification refers to a unit in which at least one function or operation is performed, and may be implemented as hardware, software, or a combination of hardware and software.

The term "user" used herein denotes a person who controls a function or operation of an advertisement target determining device or a plurality of devices by using the advertisement target determining device or the plurality of devices. Examples of the user may include a viewer, a manager, or an installation engineer.

The disclosure will now be described more fully with reference to the accompanying drawings.

FIG. 1 is a diagram illustrating an advertisement target determining device according to an embodiment.

As shown in FIG. 1, an advertisement target determining device 100 may be connected to a plurality of devices 200 through a network or short-range communication.

The network or short-range communication may include wireless communication or wired communication. The wireless communication may include wireless communication through an access point (AP) and direct wireless communication without an AP. Examples of the direct communication may include Bluetooth, Bluetooth low energy, radio frequency (RF) communication, Wi-Fi Direct, Zigbee, ultra wideband (UWB), near field communication (NFC), and infrared data association (IrDA). Examples of the wired communication may include Ethernet, etc.

The advertisement target determining device 100 may receive usage history information from the plurality of devices 200 through the network or by short-distance communication, determine a device that is to be an advertisement target among a plurality of devices, by analyzing the received usage history information, and transmit an advertisement to the determined advertisement target device.

According to an embodiment, the advertisement target determining device 100 may be a server that transmits advertisements to the plurality of devices 200, but this is only an embodiment and may be implemented in various ways.

The advertisement target determining device 100 may be implemented in various forms, such as a super computer, a tablet personal computer (PC), a laptop computer, a netbook computer, a desktop, personal digital assistants (PDAs), a portable multimedia player (PMP), and other home appliances.

Referring to FIG. 1, the plurality of devices 200 may include display devices such as smartphones or TVs, but this is only an example and various other display devices may be used.

According to an embodiment, the plurality of devices 200 may include all display devices capable of processing image data received from the outside or image data stored therein and visually displaying the processed image data.

According to another embodiment, the plurality of devices 200 may include devices that are either configured or a user has agreed to provide usage history information to the advertisement target determining device 100.

For example, the plurality of devices 200 may be implemented in various forms, such as a tablet PC, a digital camera, a camcorder, a laptop computer, a netbook computer, a desktop computer, an e-book terminal, a video phone, a digital broadcast terminal, PDAs, a PMP, a navigation device, an MP3 player, a wearable device, a smart refrigerator, and other home appliances.

In particularly, embodiments of the present disclosure may be implemented when the plurality of devices 200 are display devices that include displays and are capable of processing image data received from the outside or image data stored therein and visually displaying the processed image data, but are not limited thereto. The plurality of devices 200 may be fixed or movable, and may be a digital broadcast receiver capable of digital broadcasting reception.

The plurality of devices 200 may be implemented as not only a flat display apparatus but also a curved display apparatus having a curvature or a flexible display apparatus with an adjustable curvature. Respective output resolutions of the plurality of devices 200 may include, for example, a high definition (HD), a full HD, an ultra HD, or a resolution that is clearer than an ultra HD.

In general, after determining a target device suitable for an advertisement purpose of an advertiser, the advertiser may determine an advertisement target device by extracting a group similar to the target device.

In the conventional art, this advertisement target device determination procedure includes a manual procedure through participation of a data scientist.

The present disclosure relates to an advertising device determining apparatus and an advertising device determining method enabling timely advertisement due to reduction in the costs and time for determining an advertisement target device, by automatizing all operations including a target device determination operation and an operation of extracting a device similar to a target device to determine an advertisement target.

A method of automatically determining a target device and a method of automatically extracting a device similar to a target device and determining an advertisement target will be described later.

Figure 2:
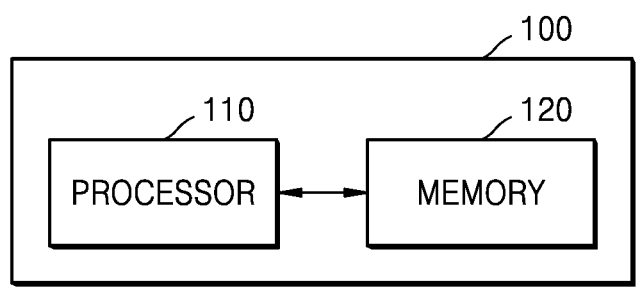
FIG. 2 is a block diagram of an advertisement target determining device according to an embodiment.

FIG. 2 is a block diagram of an advertisement target determining device according to an embodiment.

Referring to FIG. 2, the advertisement target determining device 100 may include a processor 110 and a memory 120.

The memory 120 may store a program for processing and controlling the processor 110. The memory 120 may store data that is input to the advertisement target determining device 100 or output by the advertisement target determining device 100.

The memory 120 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The memory 120 may store one or more instructions executable by the processor 110.

According to an embodiment, the memory 120 may store various types of information that are received through an input/output interface.

According to an embodiment, the memory 120 may store an instruction for controlling obtainment of usage history information from the plurality of devices 200, obtainment of features of the plurality of devices 200 based on the usage history information, generation of a feature vector for the features, and automatic determination of a label for each of the plurality of devices 200, based on an advertisement request and the features.

According to an embodiment, the memory 120 may store an instruction for controlling automatic generation of an advertisement target inference model, based on the labels and the feature vectors, and determination of an advertisement target device among the plurality of devices 200 due to application of the generated advertisement target inference model to the plurality of devices.

When there is an input from a user or stored preset conditions are satisfied, the processor 110 may execute an operating system (OS) and various applications that are stored in the memory 120.

The processor 110 may include a RAM that stores a signal or data received from the outside of the advertisement target determining device 100 or is used as storage media for various operations performed by the advertisement target determining device 100, and a ROM that stores a control program for controlling the advertisement target determining device 100.

The processor 110 may include a single core, a dual core, a triple core, a quad core, or a multiple core thereof. The processor 110 may include a plurality of processors. For example, the processor 110 may be implemented by using a main processor and a sub-processor operating in a sleep mode.

The processor 110 may include at least one of a central processing unit (CPU), a graphics processing unit (GPU), or a video processing unit (VPU). Alternatively, in some cases, the processor 110 may be implemented in the form of a system on chip (SOC) that integrates at least one of a CPU, a GPU, or a VPU.

The processor 110 may control the components of the advertisement target determining device 100 by executing the one or more programs stored in the memory 120.

According to an embodiment, the memory 110 may obtain the usage history information from the plurality of devices 200, obtain the features of the plurality of devices 200, based on the usage history information, generate the respective feature vectors for the obtained features, automatically determine the label for each of the plurality of devices 200, based on the advertisement request and the features, automatically generate the advertisement target inference model, based on the labels and the feature vectors, and determine the advertisement target device among the plurality of devices 200 due to application of the generated advertisement target inference model to the plurality of devices.

According to an embodiment, the processor 110 may determine the label as '1' by extracting a device that has achieved an advertisement purpose with respect to an advertisement object included in the advertisement request from among the plurality of devices 200, based on the usage history information, and, by using the features obtained from the extracted device and a preset algorithm, may determine the label as '1' by extracting a device similar to the device that has achieved the advertisement purpose with respect to the advertisement object from among the remaining devices for which their labels are not determined as '1' and may determine that the remaining devices for which their labels have not yet been determined have labels of '0'.

According to an embodiment, the processor 110 may generate the advertisement target inference model by using a neural network trained to generate the advertisement target inference model from the labels and the feature vectors.

According to an embodiment, the processor 110 may obtain scores by applying the advertisement target inference model to the plurality of devices 200, and, based on the obtained scores, may determine a device having a score greater than or equal to a certain value among the plurality of devices 200 as an advertisement target.

According to an embodiment, the processor 110 may filter the determined advertisement target, based on an advertisement condition included in the advertisement request, thereby finally determining the advertisement target.

Figure 3:
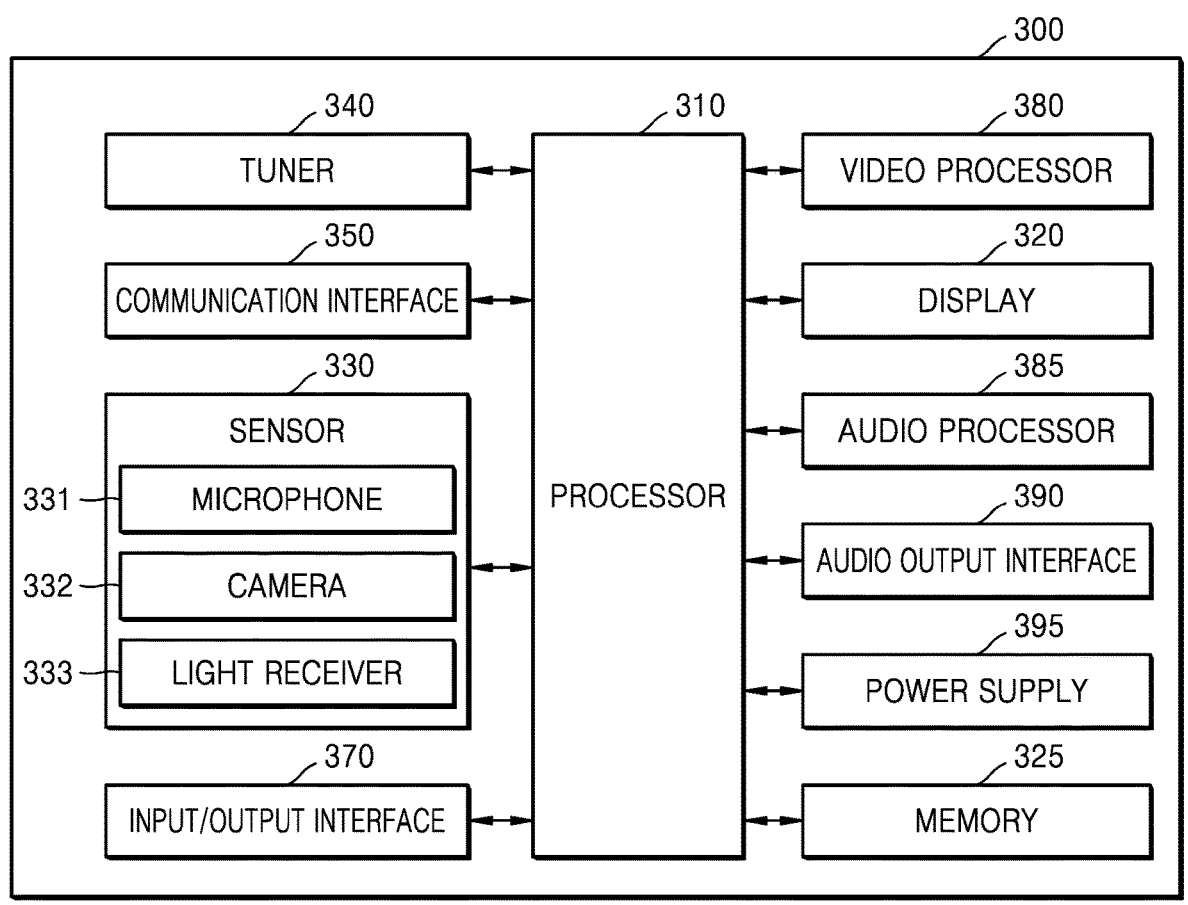
FIG. 3 is a block diagram of a structure of one device among the plurality of devices, according to an embodiment.

FIG. 3 is a block diagram of a structure of a device 300 among the plurality of devices 200, according to an embodiment.

The device 300 of FIG. 3 may be one of the plurality of devices 200 of FIG. 1. The device 300 of FIG. 3 may be a display device.

Referring to FIG. 3, the device 300 may include a tuner 340, a processor 310, a display 320, a communication interface 350, a sensor 330, an input/output (I/O) interface 370, a video processor 380, an audio processor 385, an audio output interface 390, a memory 325, and a power supply 395.

The communication interface 350 according to an embodiment may include a Wi-Fi module, a Bluetooth module, an infrared communication module, a wireless communication module, a LAN module, an Ethernet module, a wired communication module. Each of these communication module may be implemented in the form of at least one hardware chip.

The Wi-Fi module and the Bluetooth module may perform communication according to a Wi-Fi method and a Bluetooth method, respectively. When using a Wi-Fi module or a Bluetooth module, the communication interface 350 may first transmit or receive various types of connection information, such as a service set ID (SSID) and a session key, connect with various external devices by using the various types of connection information, and then transmit or receive various pieces of information. The wireless communication module may include at least one communication chip that performs communication according to various wireless communication standards, such as Zigbee, $3^{rd}$ Generation (3G), $3^{rd}$ Generation Partnership Project (3GPP), Long Term Evolution (LTE), LTE Advanced (LTE-A), $4^{th}$ Generation (4G), and $5^{th}$ Generation (5G).

The communication interface 350 according to an embodiment may transmit usage history information of the device 300 to the advertisement target determining device 100, and may receive an advertisement from the advertisement target determining device 100.

The tuner 340 according to an embodiment may tune and select a frequency of a channel which the advertisement target determining device 100 wants to receive from among many radio wave components via amplification, mixing, resonance, or the like of a wired or wireless broadcasting signal. The broadcasting signal includes audio, video, and additional information (for example, an electronic program guide (EPG)).

The tuner 340 may receive a broadcasting signal from various sources, such as terrestrial broadcasting, cable broadcasting, satellite broadcasting, and Internet broadcasting. The tuner 340 may also receive a broadcasting signal from a source such as analog broadcasting or digital broadcasting.

The sensor 330 may sense a voice of the surroundings of the device 300, an image of the surroundings of the device 300, or an interaction with the surroundings of the device 300, and may include at least one of a microphone 331, a camera 332, or a light receiver 333. The sensor 330 may sense the status of the device 300 or the status of the surrounding of the device 300 and may transmit information corresponding to the sensed status to the processor 310.

The microphone 331 receives an uttered voice of a user and a voice generated from the surrounding of the device 300. The microphone 331 may transform the received voice into an electrical signal and output the electrical signal to the processor 310. The microphone 331 may use various noise removal algorithms in order to remove noise that is generated while receiving an external audio signal.

The camera 332 may obtain an image frame, such as a still image or a moving picture. An image captured via the image sensor may be processed by the processor 310 or a separate image processor (not shown).

The image frame obtained by the camera 332 may be stored in the memory 325 or transmitted to the outside via the communication interface 350. At least two cameras 332 may be included according to configurations of the advertisement target determining device 100.

The light receiver 333 receives an optical signal (including a control signal) from an external remote control device (not shown). The light receiver 333 may receive an optical signal corresponding to a user input (for example, touch, pressing, a touch gesture, a voice, or a motion) from the remote control device (not shown). A control signal may be extracted from the received optical signal under the control by the processor 310. For example, the light receiver 333 may receive a control signal corresponding to a channel up/down button for channel switching from the remote control device (not shown).

The sensor 330 of FIG. 3 is illustrated as including the microphone 331, the camera 332, and the light receiver 333, but is not limited thereto, and may include at least one selected from a magnetic sensor, an acceleration sensor, a temperature/humidity sensor, an infrared sensor, a gyroscope sensor, a position sensor (e.g., a global positioning system (GPS)), a pressure sensor, a proximity sensor, an RGB sensor, an illuminance sensor, or a Wi-Fi signal receiver. Functions of most of the sensors would be instinctively understood by one of ordinary skill in the art in view of their names and thus detailed descriptions thereof will be omitted herein for conciseness.

The sensor 330 of FIG. 3 is illustrated as being included in the device 300, but is not limited thereto, and may be included in a control device that is located independently of the device 300 and communicates with the device 300, such as a remote controller.

When the sensor 330 is included in a control device of the device 300, the control device may digitize information sensed by the sensor 330 and transmit the digitized information to the device 300. The control device may communicate with the device 300 via short-range communication including infrared, Wi-Fi, or Bluetooth.

For example, a microphone may be included in the device 300, but may be included in a control device that is located independently of the device 300 and communicates with the device 300, such as a remote controller.

According to an embodiment, when a microphone is included in a remote controller, an analog audio signal may be received through the microphone, and the remote controller may digitize the analog audio signal and transmit the digitized analog audio signal to a TV. In this case, the remote controller may communicate with the advertisement target determining device 100 via short-range communication including infrared, Wi-Fi, or Bluetooth.

According to an embodiment, the device 300 may include a plurality of communication interfaces 350 capable of various short-range communications including infrared, Wi-Fi, or Bluetooth.

According to an embodiment, the device 300 may include a plurality of communication interfaces 350 in which a communication interface communicating with the advertisement target determining device 100 and a communication interface communicating with a remote controller are different from each other.

According to an embodiment, the device 300 may include a communication interface 350 in which a communication interface communicating with the advertisement target determining device 100 and a communication interface communicating with a remote controller are the same as each other.

According to an embodiment, a device, such as a smartphone, in which a remote control application is provided may perform the same role as the above-described remote controller. In other words, the device in which a remote control application is provided may control the device 300 such as a TV, and may perform a voice recognition function.

The device in which a remote control application may be provided may be any device capable of installing and operating an application, such as an artificial intelligence (AI) speaker, in addition to a smartphone.

The input-output (I/O) interface 370 receives video (for example, a moving picture), audio (for example, a voice or music), and additional information (for example, an EPG) from outside the device 300 under a control by the processor 310. The I/O interface 370 may include a High-Definition Multimedia Interface (HDMI), a Mobile High-Definition Link (MHL), a Universal Serial Bus (USB), a Display Port (DP), a Thunderbolt, a Video Graphics Array (VGA) port, an RGB port, a D-subminiature (D-SUB), a Digital Visual Interface (DVI), a component jack, or a personal computer (PC) port.

The video processor 380 processes video data that is received by the device 300. The video processor 380 may perform a variety of image processing, such as decoding, scaling, noise filtering, frame rate transformation, and resolution transformation, on the received video data.

The display 320 generates a driving signal by converting an image signal, a data signal, an on-screen display (OSD) signal, and a control signal that are processed by the processor 310. The display 320 may be a plasma display panel (PDP), a liquid-crystal display (LCD), an organic light-emitting device (OLED), a flexible display, or a 3-dimensional (3D) display. The display 320 may be configured as a touch screen, and thus may serve as an input device as well as an output device.

The display 320 may output various contents that are input via the communication interface or the I/O interface 370, or may output an image stored in the memory 325. The display 320 may also output, to a screen, information input by the user through the I/O interface 370.

The display 320 may include a display panel. The display panel may be a liquid crystal display (LCD) panel or a panel including various illuminators such as a light emitting diode (LED), an organic light emitting diode (OLED), and a cold cathode fluorescent lamp (CCFL). The display panel may include not only a flat display device but also a curved display device with a curvature or a flexible display device capable of adjusting a curvature. The display panel may be a 3D display or an electrophoretic display.

An output resolution of the display panel may be, for example, a high definition (HD), a full HD, an ultra HD, or a resolution that is clearer than an ultra HD.

In the embodiment of FIG. 3, the device 300 is illustrated as including a display, but is not limited thereto. The device 300 may be configured to transmit a video/audio signal to a separate display device including a display by being connected to the separate display device via wire/wireless communication.

The audio processor 385 processes audio data. The audio processor 385 may perform a variety of processing, such as decoding, amplification, or noise filtering, on the audio data. The audio processor 385 may include a plurality of audio processing modules to process audios corresponding to a plurality of pieces of content.

The audio output interface 390 outputs audio included in a broadcasting signal received via the tuner 340, under a control by the processor 310. The audio output interface 390 may output audio (for example, a voice or a sound) that is input via the communication interface 350 or the I/O interface 370. The audio output interface 390 may also output audio stored in the memory 325 under a control by the processor 310. The audio output interface 390 may include at least one of a speaker, a headphone output port, or a Sony/Philips Digital Interface (S/PDIF) output port.

The power supply 395 supplies power that is input from an external power source, to the internal components of the advertisement target determining device 100, under a control by the processor 310. The power supply 395 may also supply power that is output by one or more batteries (not shown) located in the advertisement target determining device 100, to the internal components of the advertisement target determining device 100, under the control by the processor 310.

The memory 325 may store various data, programs, or applications for driving and controlling the device 300 under a control by the processor 310. The memory 325 may include a broadcasting receiving module, a channel control module, a volume control module, a communication control module, a voice recognition module, a motion recognition module, a light receiving module, a display control module, an audio control module, an external input control module, a power control module, a power control module of a plurality of wirelessly (for example, Bluetooth) connected devices, a voice database (DB), or a motion DB, which are not shown. These modules and the DBs of the memory 325 may be implemented as software in order to perform a broadcasting reception control function of the device 300, a channel control function, a volume control function thereof, a communication control function thereof, a voice recognition function thereof, a motion recognition function thereof, a light receiving control function thereof, a display control function thereof, an audio control function thereof, an external input control function thereof, a power control function thereof, or a power control function of the wirelessly (for example, Bluetooth) connected device 300. The processor 310 may perform these functions by using the software stored in the memory 325.

The block diagrams of the advertisement target determining device 100 of FIG. 2 and the device 300 shown in FIG. 3 are for an embodiment. Components illustrated in FIGS. 2 and 3 may be combined or omitted according to the specifications of devices when being actually implemented, or additional components may be included in the block diagrams of FIGS. 2 and 3. In other words, when necessary, two or more components may be combined into a single component, or a single component may be divided into two or more components. A function performed in each block is merely an example to explain embodiments, and a detailed operation or device of each block does not limit the scope of the embodiments.

Figure 4:
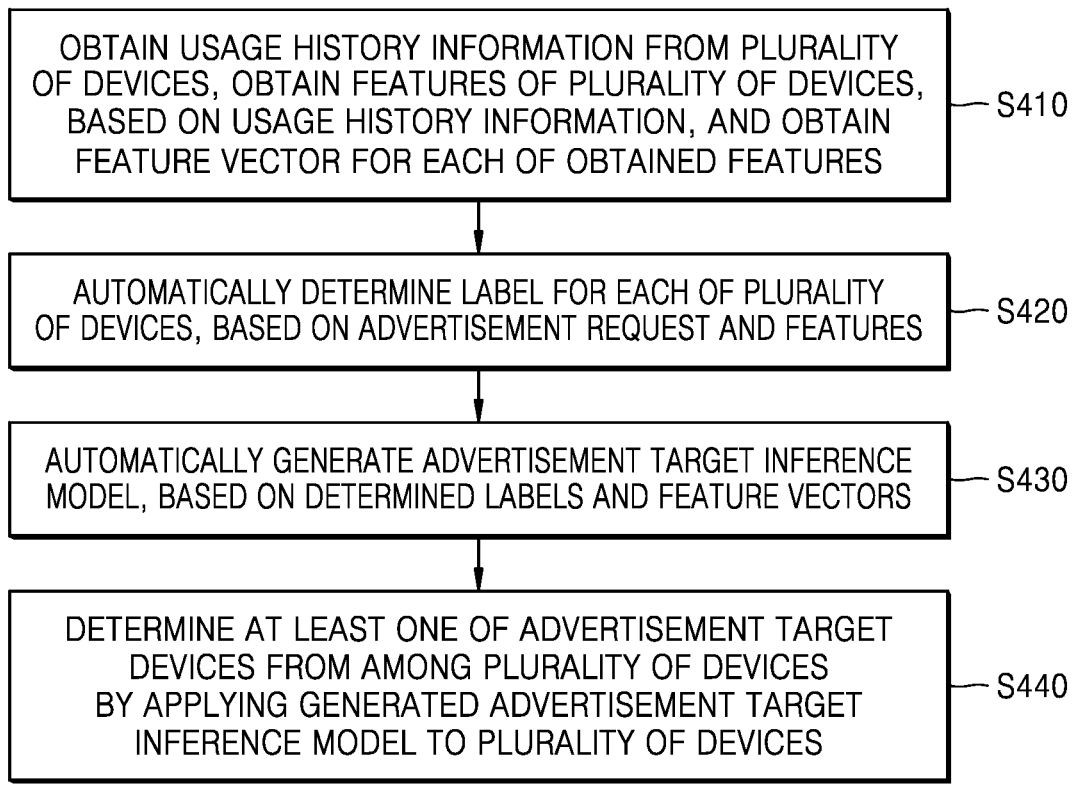
FIG. 4 is a flowchart of an advertisement target determining method according to an embodiment.

FIG. 4 is a flowchart of an operation method of the advertisement target determining device 100, according to an embodiment.

Referring to FIG. 4, the advertisement target determining device 100 may obtain usage history information from the plurality of devices 200, obtain features of the plurality of devices 200, based on the usage history information, and obtain a feature vector for each of the obtained features (S410).

The advertisement target determining device 100 may obtain the usage history information from the plurality of devices 200 in response to the advertisement request.

The "use history information" used herein may be all record information that a user has used a device. For example, the usage history information may include TV program viewing history information, application usage information, external device usage status information, genre and viewing time information of watched TV programs, game play time information, VoD viewing history information, type and game maker information of a played game, app store usage information, information about users, and the like.

According to an embodiment, the usage history information may be usage history information for a specific period. For example, the usage history information may be usage history information for one year.

The advertisement target determining device 100 may refine (pre-process) the usage history information to obtain features from the usage history information obtained from the plurality of devices 200.

The "feature" used herein may refer to all data from which the user's behavior pattern related to the plurality of devices 200 may be extracted. For example, the feature may be the same concept as the use history information. In this case, the usage history information may be a feature as it is. As another example, the feature may be superordinate to the use history information. In this case, an operation of mapping the usage history information to a superordinate concept may be needed.

The advertisement target determining device 100 may refine the usage history information to obtain the features of the plurality of devices 200 from the usage history information obtained from the plurality of devices 200.

For example, the advertisement target determining device 100 may map the usage history information to a superordinate concept that is to be used for a feature, or may remove unusual data with low generality. As another example, the advertisement target determining device 100 may extract only information about a specific usage time.

The advertisement target determining device 100 may obtain the features from the usage history information obtained from the plurality of devices 200.

The features may include at least one of information about a device user including age, gender, region and income information, advertisement viewing information, advertisement click information, application usage information, external device usage information, TV viewing information, VoD viewing information, application installation and removal information, device usage pattern information, or played game information. However, the features are not limited thereto.

The advertisement target determining device 100 may generate respective feature vectors for the features. The feature vectors may be vectors in which the features are represented to be suitable for machine learning.

The advertisement target determining device 100 may generate a feature vector by extracting a feature point of each device. The generated feature vector may be an input value of an advertisement target inference model generated later in operation S430.

Details thereof will be described later with reference to FIGS. 5 and 6.

The advertisement target determining device 100 may automatically determine a label for each of the plurality of devices 200, based on the advertisement request and the features (S420).

In the disclosure, the advertisement request is a request received from an advertiser or an advertisement agency, and may include at least one of an advertisement sector, an advertisement object, an advertisement cost, an advertisement condition, or an advertisement purpose.

In the disclosure, the advertisement sector may refer to a sector to which an advertisement object belongs, such as a brand advertisement, a game advertisement, a finance advertisement, or a travel advertisement.

In the disclosure, the advertisement object may refer to a specific product for which an advertisement is intended, among the products belonging to an advertisement sector. For example, in the case of a brand advertisement, the advertisement object may refer to a specific brand name to be advertised, and, in the case of a game advertisement, the advertisement object may refer to a specific game name.

In the disclosure, the advertisement purpose may refer to a goal to be achieved with respect to the advertisement object. Examples of the advertising purpose may include increasing new users, increasing usage rates of non-use users, and increasing usage time of current users. According to an embodiment, the advertisement target determining device 100 may recognize a user who has not used a product for 13 months or more as a non-use user.

In the disclosure, the "label" may be information indicating, in a binary format, whether each of the plurality of devices 200 is a device that has achieved the advertisement purpose of the advertiser's advertisement object, as a result of determination based on the use history information of the plurality of devices 200 obtained in operation S410.

In the disclosure, the "label" may include information indicating, in a binary format, whether each of the plurality of devices 200 is a device in which the advertiser's advertisement purpose was not achieved but the probability that the advertiser's advertisement purpose is achieved is equal to or greater than a threshold value, as a result of determination based on the use history information of the plurality of devices 200 obtained in operation S410.

For example, when the advertiser's advertisement purpose is to increase new users of a content-related application named A, the usage history among the plurality of devices 200 is analyzed, and thus a device that became a new user of the content-related application named A during the analysis may be determined as a device in which the advertiser's advertisement purpose has been achieved.

In the disclosure, the label of the device in which the advertiser's advertisement purpose has been achieved may be determined as '1'.

According to an embodiment, as a result of determining the labels of all devices, based on the above-described criterion, when the number of devices with the label '1' is too small, the advertisement target determining device 100 may also determine, as '1', the label of a device that did not become a new user of the application A but has a probability of becoming a new user of the application A, the probability being equal to or greater than the threshold value.

The advertisement target determining device 100 may determine the labels of devices other than the device whose label is determined as '1' as '0' during the above two operations.

According to an embodiment, the operation of determining the label may include an operation of, based on the use history information, extracting a device that achieves the advertiser's advertisement purpose with respect to the advertisement object included in the advertisement request from among the plurality of devices 200 to determine the label of the extracted device as '1', and an operation of determining, as '0', a label of a device whose label has not yet been determined.

According to another embodiment, the operation of determining the label may include an operation of extracting a device that has achieved the advertisement purpose with respect to the advertisement object included in the advertisement request from among the plurality of devices 200, based on the usage history information, to determine the label of the extracted device as '1', an operation of extracting a device with similar features to those of the device that has achieved the advertisement purpose with respect to the advertisement object from among devices for which their labels have not been determined yet, by using the features obtained from the extracted device and a preset algorithm, to determine the label of the extracted device as '1', and an operation of determining that the devices for which their labels have not yet been determined have labels of '0'.

According to an embodiment, the preset algorithm is an algorithm using the priority of features, and the priority of the features may be determined through experimentation.

According to an embodiment, the preset algorithm may be an algorithm using weights for features, which are obtained using a neural network trained to obtain the weights for the features by analyzing an advertisement request.

The advertisement target determining device 100 may determine respective labels of all of the plurality of devices 200. In this case, the devices whose labels have been determined as '1' may be target devices that meet the advertisement purpose of the advertiser.

A method of determining a label will be described later in more detail with reference to FIGS. 7 through 9.

The advertisement target determining device 100 may determine and obtain different features, feature vectors, and labels according to the contents of the advertisement request even when the same usage history information is obtained from the plurality of devices 200.

The advertisement target determining device 100 may automatically generate the advertisement target inference model, based on the determined labels and the determined feature vectors (S430).

In the disclosure, the "advertisement target inference model" may be a model for inferring the possibility that each of the plurality of devices 200 may achieve an advertisement goal in the future.

According to an embodiment, the advertisement target determining device 100 may generate the advertisement target inference model by using a neural network trained to generate the advertisement target inference model from the labels determined in operation S430 and the feature vectors generated in operation S410.

Details thereof will be described later with reference to FIGS. 10 and 11.

The advertisement target determining device 100 may determine advertisement target devices from among the plurality of devices 200 by applying the generated advertisement target inference model to the plurality of devices 200 (S440).

According to an embodiment, the advertisement target determining device 100 may obtain, as a score or a number, the possibility that each device may achieve the advertisement goal in the future, by applying the advertisement target inference model to the plurality of devices 200. In this case, the score or number may be a value between 0 and 1. It may be interpreted that the closer a device's score or number is to 1, the possibility that the device meets the advertisement goal in the future is high, and the closer a device's score or number is to 0, the possibility that the device meets the advertisement goal in the future is low.

According to an embodiment, the advertisement target determining device 100 may determine, as an advertisement target, a device with a score or number equal to or greater than a preset value among the plurality of devices 200, based on the obtained scores or numbers.

For example, when the advertisement goal is to advertise on 20,000 Devices among the plurality of devices 200, the advertisement target determining device 100 may determine the 20,000 devices as the advertisement target in order of highest score.

As another example, the advertisement target determining device 100 may determine, as an advertisement target, all of devices for which scores are equal to or greater than a preset value. In this case, the preset value may be a value determined according to advertisement purposes, advertisement conditions, advertisement costs, and the like.

Although not shown in FIG. 4, the advertisement target determining method according to the disclosure may further include an operation of finally determining the advertisement target by filtering the advertisement target determined in operation S440, based on the advertisement condition included in the advertisement request.

According to an embodiment, the advertisement condition may be a condition of including or excluding a certain device in or from the advertisement target on a rule base.

For example, the advertisement condition may be a condition of excluding a specific device that satisfies condition specified by the advertiser from the advertisement target. In this case, even when a specific device is determined as the advertisement target in operation S440, the advertisement target determining device 100 may exclude the specific device from the advertisement target.

For example, the advertisement condition may be excluding a device of which a user lives in Seoul. In this case, the advertisement target determining device 100 may determine, as the advertisement target, remaining devices excluding the device of which the user lives in Seoul among the advertisement target devices determined in operation S440.

For example, the advertisement condition may be a condition of necessarily including a specific device that satisfies the condition in the advertisement target. In this case, even when a specific device that satisfies the condition is not determined as the advertisement target in operation S440, the advertisement target determining device 100 may determine the advertisement target devices by adding the specific device to the advertisement target.

Figure 5:
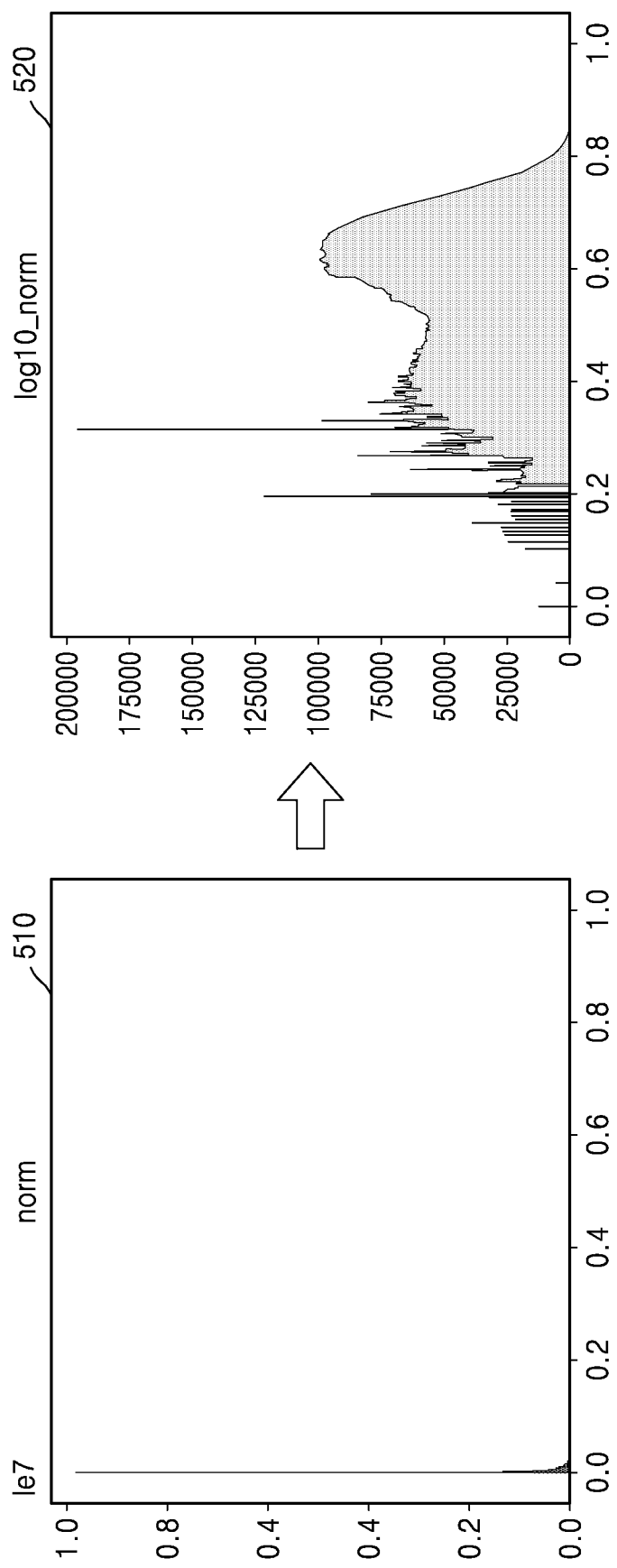
FIG. 5 is a graph for a method of resolving distortion of device usage history information in order to obtain features for a plurality of devices, according to an embodiment.

FIG. 5 is a graph showing an example of a method of resolving distortion of device usage history information in order to obtain features for a plurality of devices, according to an embodiment.

According to an embodiment, use history information for the plurality of devices 200 may be aggregated in units of one month.

According to an embodiment, a phenomenon in which values of specific information among the obtained usage history information are skewed extremely on one side may appear (as indicated by 510).

In this case, because distortion of data may appear, the advertisement target determining apparatus 100 may process the data so that the data may be evenly distributed, by applying a square root or logarithm to the values (as indicated by 520).

For example, in FIG. 5, the advertisement target determining device 100 may process the data so that the data may be evenly distributed as shown in 520, by applying a logarithm to the data skewed as shown in 510. The applied logarithm may be Log 10.

According to an embodiment, the advertisement target determining device 100 may process distortion due to the information skewing by using the square root or logarithm, and then perform feature scaling by utilizing a data normalization method.

Figure 6:
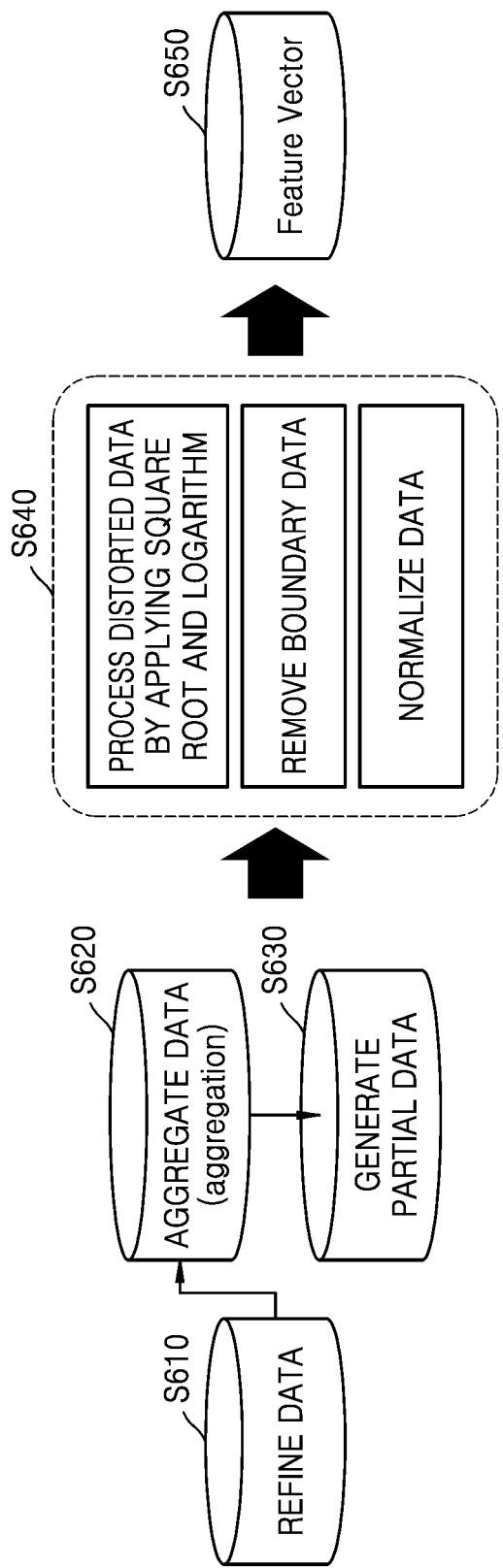
FIG. 6 is a diagram illustrating obtainment of a feature vector by using usage history information of a device, according to an embodiment.

FIG. 6 is a diagram illustrating an example of obtaining a feature vector by using usage history information of a device, according to an embodiment.

The advertisement target determining device 100 may refine usage history information obtained from the plurality of devices 200 (S610).

For example, the advertisement target determining device 100 may quantify the ratio of a usage time for each category to a total device usage time of a device user, based on the device usage history information. According to an embodiment, the categories may include at least one of an application usage time, a VOD usage time, a TV viewing time, a game usage time, an advertisement viewing time, or external device usage time.

The advertisement target determining device 100 may aggregate refined usage history information (S620). For example, the advertisement target determining device 100 may aggregate the refined usage history information in units of one month.

The advertisement target determining device 100 may generate, as partial data, some of the aggregated data (S630). For example, the advertisement target determining device 100 may select one among the data aggregated in units of one month and generate the selected data as the partial data. According to an embodiment, the advertisement target determining device 100 may select a month immediately preceding a current month and generate the selected month as the partial data. According to another embodiment, the advertisement target determining device 100 may generate, as the partial data, information selected from a plurality of pieces of usage history information according to an advertisement request.

The advertisement target determining device 100 may process the data so that the data may be evenly distributed, by applying a square root or logarithm in order to address skewing, namely, distortion, of the generated partial data, may remove boundary data, and may perform feature scaling by normalizing data (S640).

The advertisement target determining device 100 may generate the feature vector by using the normalized data (S650).

After setting the total device usage time to be 1, the advertisement target determining device 100 may calculate the ratio of the usage time for each category to generate a feature vector for a feature corresponding to the usage time for each category compared to the total device usage time.

Figure 7:
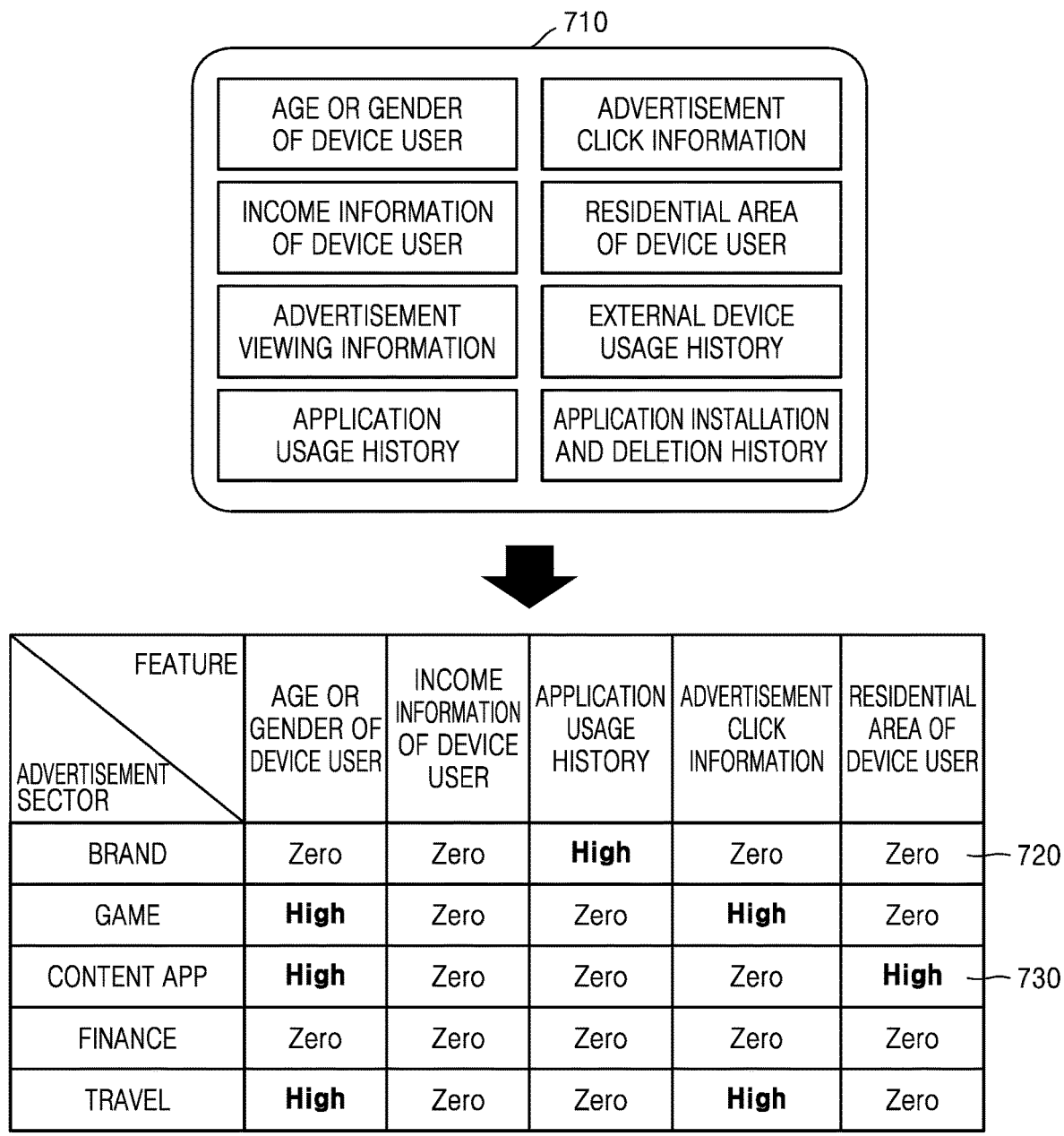
FIG. 7 is a view illustrating assignment of priorities to features by using a preset algorithm, according to an embodiment.

FIG. 7 is a view illustrating an example of assigning priorities to features by using a preset algorithm, according to an embodiment.

The advertisement target determining device 100 may automatically determine a label for each of the plurality of devices 200, based on the advertisement request and the features.

According to an embodiment, the advertisement target determining device 100 may extract a device that has achieved an advertisement purpose with respect to an advertisement object included in the advertisement request from among the plurality of devices 200, based on the usage history information of the plurality of devices 200, and may determine the level of the extracted device as '1'.

According to an embodiment, by using common features obtained from devices that have achieved the advertisement purpose with respect to the advertisement object and a preset algorithm, the advertisement target determining device 100 may extract a device with similar features to the common features of the devices that have achieved the advertisement purpose from devices for which their labels have not been determined yet, and may determine the label of the extracted device as '1'.

What device has similar features to the common features of the devices that have achieved the advertisement purpose with respect to the advertisement object may be determined by applying weights or priorities for a plurality of features 710.

The weights or priorities for the plurality of features 710 may be determined by the preset algorithm.

According to an embodiment, the preset algorithm may use the priorities for the features 710 determined through experimentation.

In the embodiment of FIG. 7, the features 710 include an age or gender of the device user, income information of the device user, advertisement viewing information, application usage history, advertisement click information, a residential area of the device user, external device usage history, and an application installation and deletion history.

The advertisement target determining device 100 may analyze the features 710 of the devices that have achieved the advertisement purpose with respect to the advertisement object included in the advertisement request from among the plurality of devices 200.

As a result, the advertisement target determining device 100 may determine priorities for the features 710 in the order of affecting the achievement of the advertisement purpose with respect to the advertisement object included in the advertisement request.

For example, the advertisement target determining device 100 may assign a priority 'High' to a feature with a priority equal to or greater than a preset value among the features 710, and may assign a priority 'Zero' to a feature with a priority less than the preset value among the features 710.

The priority for features 710 may vary according to advertisement sectors.

For example, when an advertisement sector is a brand, the priority of an application usage history among the features 710 may be high, and the priorities for the remaining features may be low (as indicated by 720).

In some embodiments, when an advertisement sector is a content application, the priorities of the 'age or gender of the device user' and the 'residential area of the device user' among the features 710 may be high, and the priorities for the remaining features may be low (as indicated by 730).

The advertisement target determining device 100 may determine priorities by using a preset algorithm in the features 710 obtained from the devices that has achieved the advertisement purpose with respect to the advertisement object, and may apply the determined priorities to each of the plurality of devices 200, thereby extracting a device with similar features to the devices in which the advertisement purpose with respect to the advertisement object has been achieved.

The advertisement target determining device 100 may determine the label for the extracted device as '1'.

Figure 8:
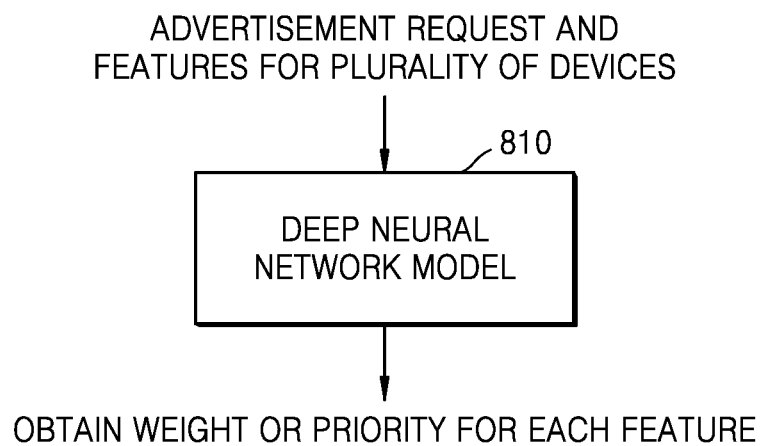
FIG. 8 is a flowchart illustrating a method, of obtaining respective weights for features by using artificial intelligence (AI), according to an embodiment.

FIG. 8 is a flowchart illustrating a method, performed by an advertisement target determining device, of obtaining respective weights for features by using artificial intelligence (AI), according to an embodiment of the present disclosure.

According to an embodiment, the advertisement target determining device 100 may use a neural network trained to obtain the weights for features from an advertisement request and features for the plurality of devices 200, to obtain a weight or priority for each of the features.

According to an embodiment of the present disclosure, the advertisement request may include an advertisement sector, an advertisement object, and an advertisement purpose.

The AI, which is a computer system that implements human-level intelligence, trains itself, and increases a recognition rate the more the AI is used. The AI includes a machine learning (deep learning) technology of using an algorithm that classifies/learns the features of pieces of input data by itself, and element technologies of mimicking functions, such as recognition and determination by human brains, by utilizing a machine learning algorithm.

For example, the element technologies may include at least one of linguistic understanding technology that recognizes human language/text, visual understanding technology that recognizes objects like human vision, deduction/prediction that logically performs deduction and prediction by determining information, knowledge representation that processes human experience information as knowledge data, vehicle's autonomous traveling, or operation control for controlling a motion of a robot.

Functions related to AI according to the disclosure are operated through the processor 110 and the memory 120. The processor 110 may be implemented as one or a plurality of processors. The one or plurality of processors 110 may be a general-purpose processor such as a CPU, an AP, or a Digital Signal Processor (DSP), a graphics-only processor such as a GPU or a Vision Processing Unit (VPU), or an AI-only processor such as an NPU. The one or plurality of processors 110 control to process input data, according to a predefined operation rule or AI model stored in the memory 120. Alternatively, when the one or plurality of processors 110 are AI-only processors, the AI-only processors may be designed in a hardware structure specialized for processing a specific AI model.

The predefined operation rule or AI model is characterized in that it is created through learning. Here, being created through learning means that a basic AI model is learned using a plurality of learning data by a learning algorithm, so that a predefined operation rule or AI model set to perform desired characteristics (or a purpose) is created. Such learning may be performed in the advertisement target determining device 100 itself on which AI according to the disclosure is performed, or may be performed through a separate server and/or system. Examples of the learning algorithm include, but are not limited to, supervised learning, unsupervised learning, semi-supervised learning, or reinforcement learning.

The AI model may be composed of a plurality of neural network layers. Each of the plurality of neural network layers has a plurality of weight values, and performs a neural network operation through an operation between an operation result of a previous layer and the plurality of weight values. The plurality of weight values of the plurality of neural network layers may be optimized by a learning result of the AI model. For example, the plurality of weight values may be updated so that a loss value or a cost value obtained from the AI model is reduced or minimized during a learning process.

According to an embodiment using a deep learning algorithm, the processor 110 may obtain the weights for the features from a result of analyzing the advertisement request, by using a pre-trained deep neural network 810. The pre-trained deep neural network model 810 may be an AI model trained through learning using the advertisement request and the features as an input value and using the weights for the features as an output value.

A deep neural network model may be, for example, a convolutional neural network (CNN). However, the disclosure is not limited thereto, and the deep neural network model may be a well-known AI model including at least one of a Recurrent Neural Network (RNN), a Restricted Boltzmann Machine (RBM), a Deep Belief Network (DBN), a Bidirectional Recurrent Deep Neural Network (BRDNN), or Deep Q-Networks.

The advertisement target determining device 100 may implement the method of obtaining the weight for each feature, by using various other machine learning algorithms.

Figure 9:
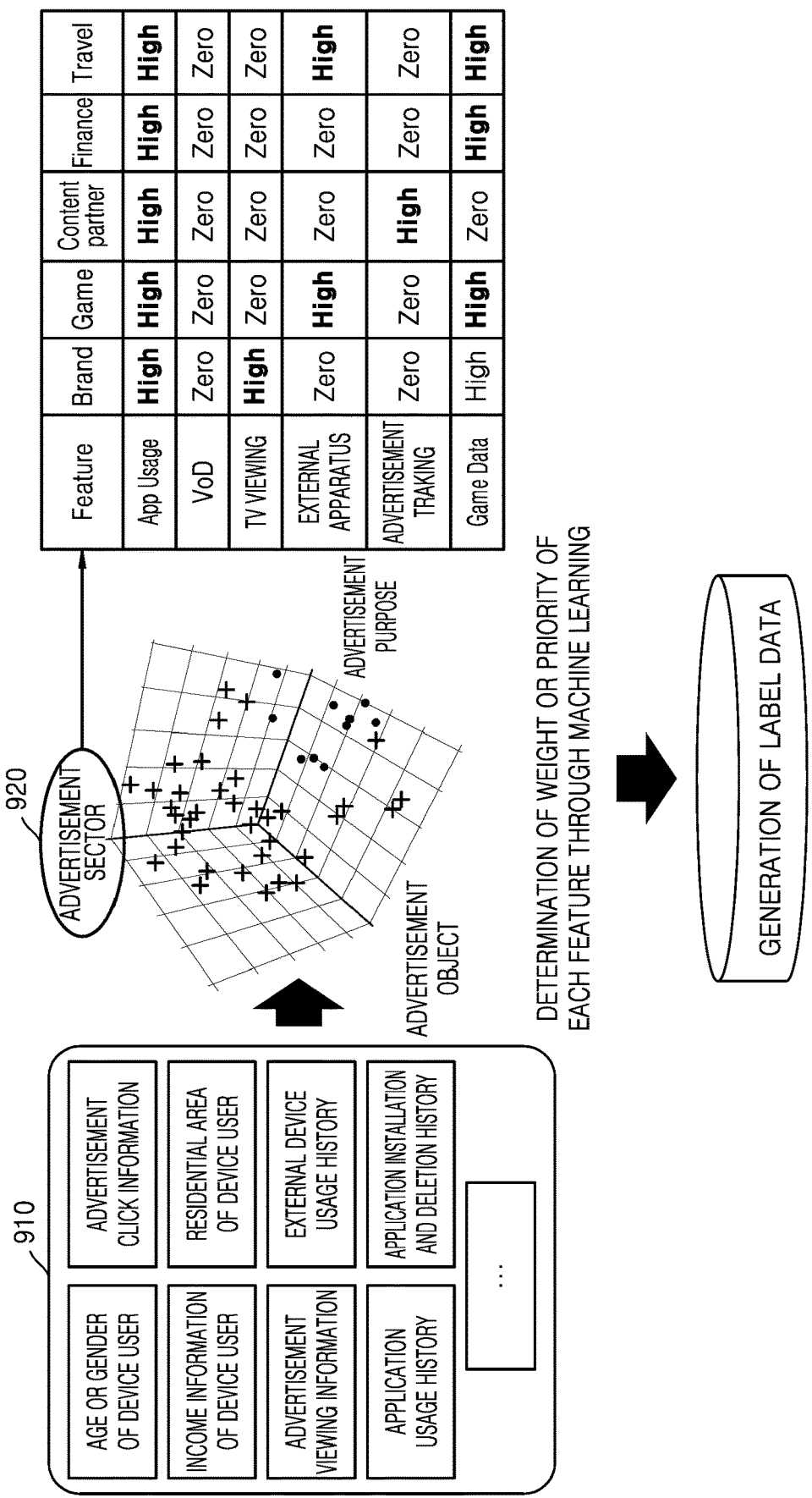
FIG. 9 is a diagram illustrating a method of determining a label by using AI, according to an embodiment.

FIG. 9 is a diagram illustrating a method, performed by an advertisement target determining device, of determining a label by using AI, according to an embodiment.

The advertisement target determining device 100 may automatically determine a label for each of the plurality of devices 200, based on the advertisement request and the features.

According to an embodiment, the advertisement target determining device 100 may extract a device that has achieved an advertisement purpose with respect to an advertisement object included in the advertisement request from among the plurality of devices 200, based on the usage history information of the plurality of devices 200, and may determine the level of the extracted device as '1'.

According to an embodiment, by using common features obtained from devices that have achieved the advertisement purpose with respect to the advertisement object and a preset algorithm, the advertisement target determining device 100 may extract a device with similar features to the common features of the devices that have achieved the advertisement purpose from devices for which their labels have not been determined yet, and may determine the label of the extracted device as '1'.

A device that has similar features to the common features of the devices that have achieved the advertisement purpose with respect to the advertisement object may be determined by applying weights or priorities for a plurality of features 910.

The weights or priorities for the plurality of features 910 may be determined by the preset algorithm.

According to an embodiment, the preset algorithm may be an algorithm using the weights for the plurality of features 910, which are obtained using a neural network trained to obtain the weights for the plurality of features 910 according to advertisement sectors by analyzing the advertisement request.

In the embodiment of FIG. 9, the preset algorithm may be an algorithm using the weights or priorities for the plurality of features 910, which are obtained using a neural network trained to obtain the weights or priorities for the plurality of features 910 according to advertisement sectors 920 from the advertisement request and the plurality of features 910.

In general, the most important factors to consider in automatically determining a label may be an advertisement sector, an advertisement object, and an advertisement purpose included in the advertisement request.

In other words, the advertisement target determining device 100 may determine the label of each device differently according to what product in what sector is advertised and what purpose is to be achieved.

Such a label determination may vary according to the plurality of features 910 obtained from the plurality of devices 200 and the priority or weight assigned to each of the plurality of features 910.

According to an embodiment, when the sector of a requested advertisement is the finance, a user's income is an important feature, and thus a high weight or a high priority may be assigned, and, on the other hand, when the sector of the requested advertisement is the game, the user's income is not an important feature, and thus a low weight or a low priority may be assigned.

According to an embodiment, when the purpose of the requested advertisement is to secure a new user who will click on the advertisement a lot, advertisement click information is an important feature, and thus a high weight or a high priority may be assigned, and, on the other hand, when the purpose of the requested advertisement is to secure a new user, the advertisement click information is not an important feature, and thus a low weight or a low priority may be assigned.

According to an embodiment, the advertisement target determining device 100 may determine whether each of the plurality of devices 200 is a device with similar features to the common features of the devices that have achieved the advertisement purpose with respect to the advertisement object, namely, may determine a label of each of the plurality of devices 200, by determining the weight or priority of each feature through machine learning and applying the determined weight or priority to each of the plurality of devices 200 as in the embodiment of FIG. 8.

Figure 10:
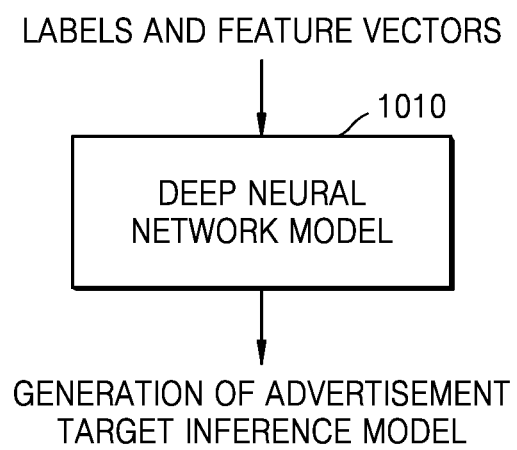
FIG. 10 is a flowchart illustrating a method of generating an advertisement target inference model by using AI, according to an embodiment.

FIG. 10 is a flowchart illustrating a method, performed by an advertisement target determining device, of generating an advertisement target inference model by using AI, according to an embodiment.

In the disclosure, the "advertisement target inference model" may be a model for inferring the possibility that each of the plurality of devices 200 achieves an advertisement goal in the future.

A label in the present embodiment may be the same as that generated in operation S420 of FIG. 4. The same contents regarding the label as those described above with reference to FIGS. 7 through 9 will be omitted.

A feature vector in the present embodiment may be the same as that generated in operation S410 of FIG. 4.

According to an embodiment, the advertisement target determining device 100 may analyze devices whose labels have been determined as '1' among the plurality of devices 200 to extract common features of the devices, and may analyze what feature among the features has a great meaning in order to achieve an advertisement purpose with respect to an advertisement object, thereby determining a weight or priority for each of the features.

A method of determining a weight or priority for each feature, according to an embodiment, may be the same as the method of determining the weight or priority for each of the plurality of devices 200 in order to determine a label for each of the plurality of devices 200 in FIGS. 7 through 9.

The advertisement target determining device 100 may apply the weight or priority for each feature to feature vectors obtained from the plurality of devices 200 to generate a model of inferring the possibility that each of the plurality of devices 200 achieves the advertisement purpose with respect to the advertisement object in the future.

According to the embodiment of FIG. 10, the advertisement target determining device 100 may generate the advertisement target inference model by using a neural network trained to generate the advertisement target inference model from the labels and the feature vectors.

The contents of AI already described above with reference to FIG. 8 will be omitted.

In an embodiment using a deep learning algorithm, the processor 110 may generate the advertisement target inference model from the labels and the feature vectors, by using a pre-trained deep neural network 1010. The pre-trained deep neural network model 1010 may be an AI model trained through learning using the respective labels of the plurality of devices 200 and the feature vectors respectively obtained for the plurality of devices 200 as an input value and using the advertisement target inference model as an output value.

When an AI model is trained to generate an advertisement target inference model according to an embodiment and a label is unbalanced, the training may not be performed smoothly. The label being unbalanced may be a case in which an unbalanced label is obtained because usage history information that only some of various features capable of achieving an advertisement purpose with respect to an advertisement object are collected in a biased way.

In order to address this problem, the advertisement target determining device 100 may reduce the label imbalance by using a class weight. The class weight may refer to different weights that are assigned to a majority class and a minority class in a process of modifying the machine learning algorithm in consideration of the asymmetric distribution of classes in order to address the problem of most machine learning algorithms that are vulnerable to biased class data.

The advertisement target determining device 100 may perform generate auto hyper-parameter tuning in order to optimize and automatize a model. The advertisement target determining device 100 may automatically set most appropriate hyper parameters through several experiments for auto hyper-parameter tuning.

According to an embodiment, when an advertiser wants to advertise to increase new users of an application 'C' in the next month, the processor 110 may obtain, as an output value, an advertisement target inference model for inferring the possibility that each of the plurality of devices 200 becomes a new user of the application 'C' in the next month, by using, as an input value of the pre-trained deep neural network model 1010, a label for each of the plurality of devices 200 generated based on the use history information of the plurality of devices 200 for several months in the past and feature vectors generated based on usage history information of the plurality of devices 200 in a current month.

The deep neural network model may be, for example, a CNN. However, the disclosure is not limited thereto, and the deep neural network model may be a well-known AI model including at least one of a Recurrent Neural Network (RNN), a Restricted Boltzmann Machine (RBM), a Deep Belief Network (DBN), a Bidirectional Recurrent Deep Neural Network (BRDNN), or Deep Q-Networks.

According to an embodiment, the advertisement target determining device 100 may generate the advertisement target inference model by using various other machine learning algorithms such as a random forest and a decision tree.

Figure 11A:
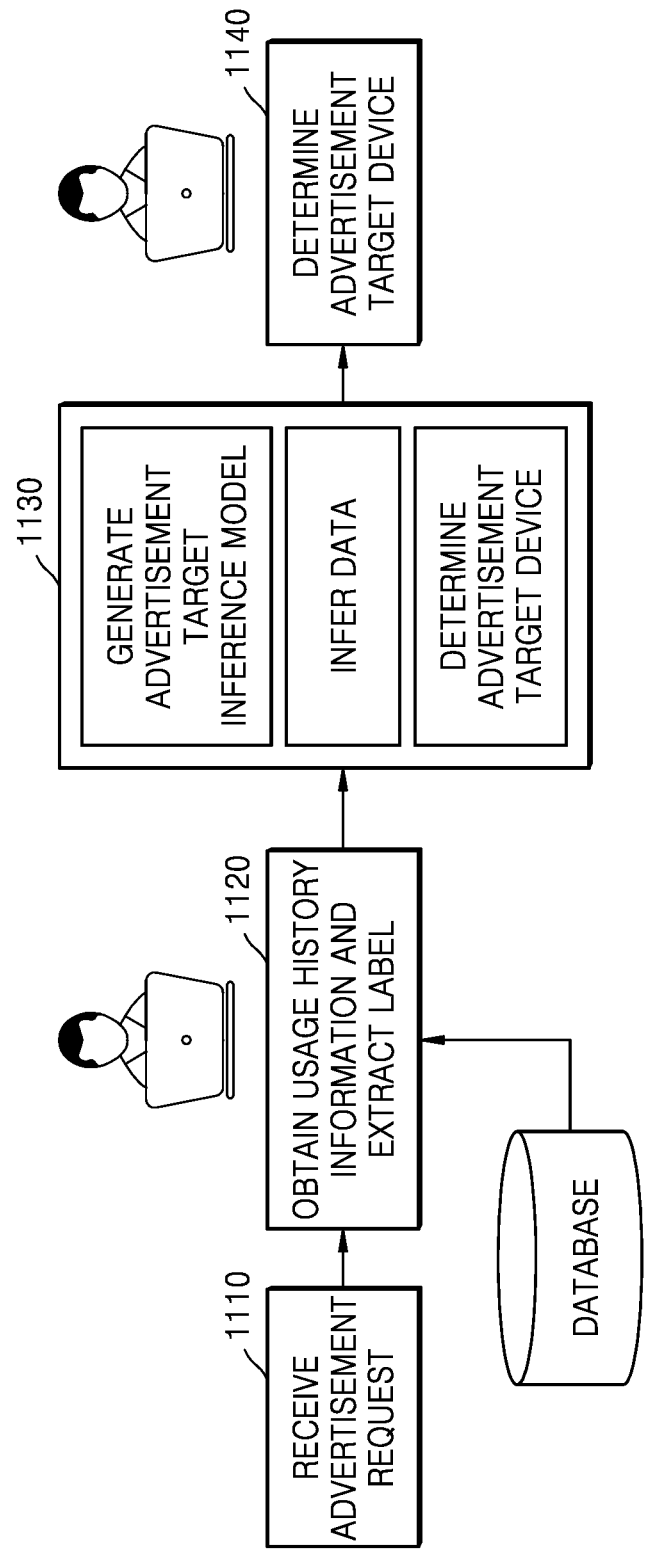
FIG. 11A is a diagram illustrating a conventional advertisement target determining method.

FIG. 11A is a diagram illustrating a conventional advertisement target determining method.

In the conventional advertisement target determining method, in response to receiving an advertisement request from an advertiser (operation1110), usage history information was obtained from a plurality of devices 200, and, based on the obtained usage history information, a label of each of the plurality of devices 200 was generated under the involvement of a data scientist (operation 1120). Alternatively, when a label is created based on seed data provided by the advertiser, the label extraction by the data scientist was omitted.

The data scientist extracted the label of each of the plurality of devices 200, based on the obtained usage history information (operation 1120), and the generated labels were stored in a database.

An advertisement target determining device generated an advertisement target inference model by obtaining the stored labels from the database, and determined an advertisement target device by inferring data by using the generated advertisement target inference model (operation 1130). Even in this case, it was necessary to involve a data scientist in the process of finally determining an advertising target device (operation 1140).

Figure 11B:
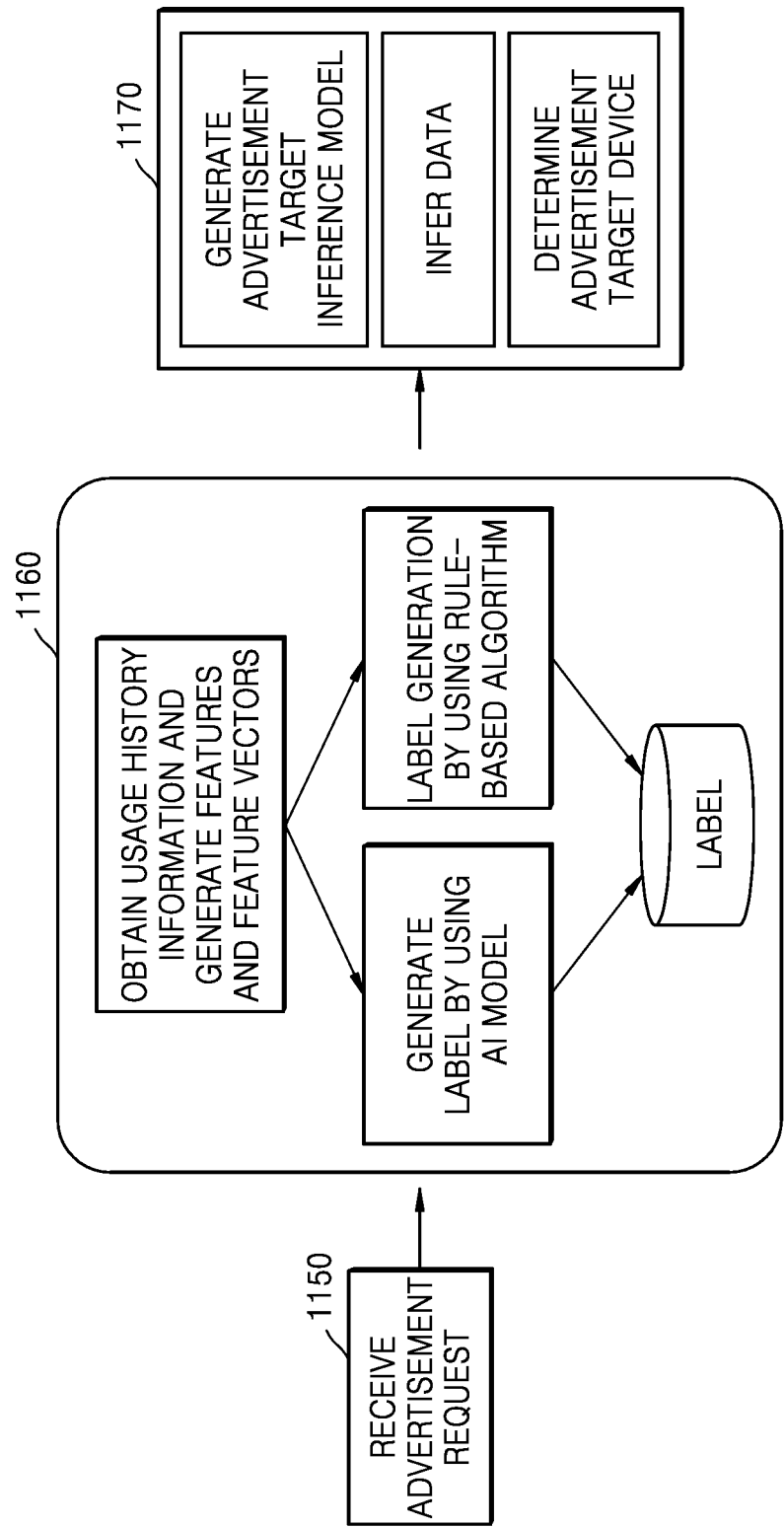
FIG. 11B is a diagram illustrating an advertisement target determining method according to an embodiment.

FIG. 11B is a diagram illustrating an advertisement target determining method according to an embodiment.

The advertisement target determining method according to an embodiment is automatized so that the involvement of a data scientist is not needed in all processes.

In response to receiving an advertisement request (operation 1150), the advertisement target determining device 100 may obtain usage history information from the plurality of devices 200, generate features for the plurality of devices 200 and feature vectors for the obtained features, based on the obtained usage history information, and generate a label by using the features (operation 1160).

In the conventional art, the label had to be manually created by a data scientist. However, in an advertisement target determining method according to the disclosure, priorities for a plurality of features are determined through many experiments, and a label is automatically extracted through the determined priorities.

The label may be generated using an AI model or may be generated using a rule-based algorithm, without the involvement of a data scientist. The label may be generated in the same manner as that described above with reference to FIG. 4 and FIG. 7 through FIG. 9.

When the advertisement target determining method according to an embodiment is used, the label may be generated without receiving seed data for a target device from an advertiser. The advertisement target determining device 100 may automatically generate the level and store the generated level in a database.

The advertisement target determining device 100 may generate an advertisement target inference model by obtaining the stored label from the database, and may automatically determine an advertisement target device by applying the generated advertisement target inference model to data obtained from the plurality of devices 200 (operation 1170).

Figure 12:
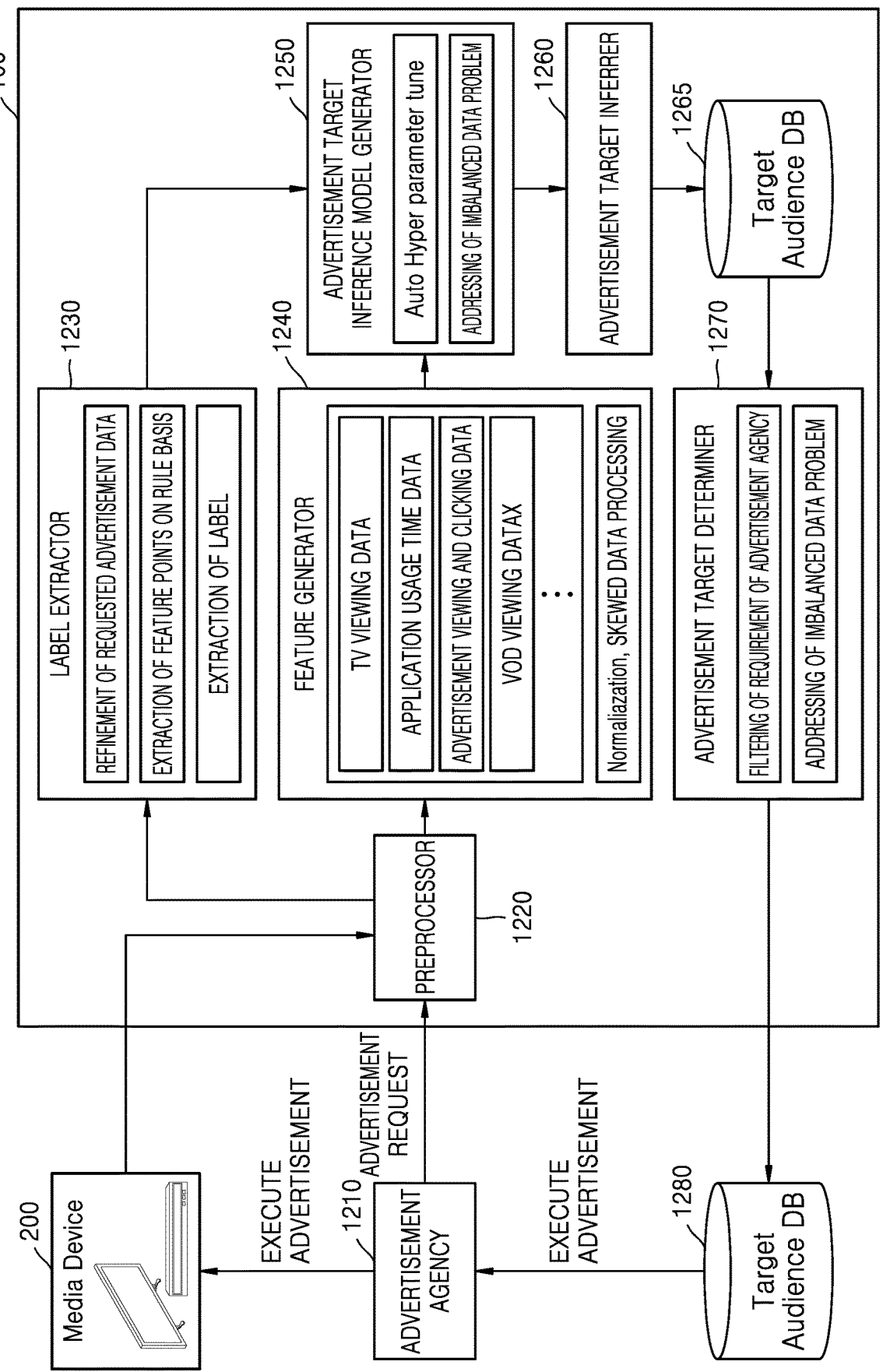
FIG. 12 is a diagram illustrating a configuration of an advertisement target determining device that determines an advertisement target in response to an advertisement request and performs an advertisement, according to an embodiment.

FIG. 12 is a diagram illustrating a configuration of an advertisement target determining device that determines an advertisement target in response to an advertisement request and performs an advertisement, according to an embodiment.

According to the embodiment of FIG. 12, the advertisement target determining device 100 may include a preprocessor 1220, a label extractor 1230, a feature generator 1240, an advertisement target inference model generator 1250, an advertisement target inferrer 1260, and an advertisement target determiner 1270.

The pre-processor 1220 may receive the advertisement request from an advertisement agency 1210.

The pre-processor 1220 may receive usage history data from the plurality of devices 200 in response to the received advertisement request. Although the plurality of devices 200 are illustrated as mobile devices in the embodiment of FIG. 12, the disclosure is not limited thereto, and the plurality of devices 200 may be implemented as various display devices as described above with reference to FIG. 1.

The pre-processor 1220 may refine (pre-process) the usage history data obtained from the plurality of devices 200 so that the usage history data may be conveniently used.

The label extractor 1230 may receive the advertisement request from the pre-processor 1220, and may refine the received advertisement request.

The label extractor 1230 may receive the preprocessed usage history data from the preprocessor 1220, and may extract feature points of devices that have achieved an advertisement purpose with respect to an advertisement object by using a rule-based algorithm. According to an embodiment, the label extractor 1230 may receive the preprocessed usage history data from the preprocessor 1220, and may extract feature points of devices that have achieved an advertisement purpose with respect to an advertisement object by using a machine learning algorithm. The label extractor 1230 may extract a label for each of the plurality of devices 200 by using the extracted feature points.

The feature generator 1240 may receive the preprocessed usage history data from the preprocessor 1220, and may generate features of each of the plurality of devices 200 by using the received preprocessed usage history data. The features may include TV viewing data, application usage time data, advertisement viewing and clicking data, VoD viewing data, and the like.

The feature generator 1240 may distribute the data evenly by performing normalization to obtain the features from the usage history data or by processing a distortion phenomenon in which data values are extremely skewed to one side.

The advertisement target inference model generator 1250 may generate an advertisement target inference model via processes such as auto hyper parameter tuning and resolution of imbalanced data, with respect to the feature vectors received from the label extractor 1230 and the feature generator 1240.

The advertisement target inferrer 1260 may infer an advertisement target device from the plurality of devices 200 by using the advertisement target inference model generated by the advertisement target inference model generator 1250.

According to an embodiment, the advertisement target inferrer 1260 may obtain a score by applying the advertisement target inference model to each of the plurality of devices 200. In this case, the score may be a value between 0 and 1. The closer the score of a device is to 1, the possibility that the device meets an advertisement goal in the future may be high. On the other hand, the closer the score of a device is to 0, the possibility that the device meets an advertisement goal in the future may be low.

According to an embodiment, the advertisement target inferrer 1260 may determine, as an advertisement target, a device with a score equal to or greater than a preset value among the plurality of devices 200, based on the obtained scores.

The advertisement target inferrer 1260 may store a device determined as an advertisement target device in a database 1265. In this case, the database 1265 may exist inside or outside the advertisement target determining device 100.

The advertisement target determiner 1270 may filter the advertisement target device according to a requirement of the advertisement agency 1210, namely, an advertisement condition. Details thereof may be the same as those described with reference to FIG. 4 with regard to the filtering of the determined advertisement target, based on the advertisement condition included in the advertisement request, to finally determine the advertisement target.

The advertisement target determiner 1270 may address an imbalanced data problem by using various methods.

The advertisement target determiner 1270 may finally determine the advertisement target device through the filtering and the addressing of the imbalanced data problem. The advertisement target determiner 1270 may store information about the determined advertisement target device in a database 1280.

According to an embodiment, the database 1265 and the database 1280 may be the same as each other.

The advertisement agency 1210 may obtain information about devices determined as advertisement target devices from the database 1280, and may perform advertisements on the devices.

FIG. 13 is Table showing an example of an advertisement request received by an advertisement target determining device, according to an embodiment.

The advertisement target determining device 100 may receive an advertisement request in which an advertisement sector is a content application, an advertisement object is an Xflix application, an advertisement purpose is to increase new users, and an advertisement condition is to advertise on 1 million devices manufactured after the year 2018.

The advertisement target determining device 100 may obtain usage history information for the last one year from the plurality of devices 200 in response to the advertisement request, and may refine the obtained usage history information. The advertisement target determining device 100 may obtain features of the plurality of devices 200 and respective feature vectors of the features from the refined usage history information. The advertisement target determining device 100 may determine respective priorities or weights for the features by using the advertisement sector, the advertisement object, and the advertisement purpose included in the advertisement request, and may generate a label for each of the plurality of devices 200 by using the determined priorities or weights.

The advertisement target determining device 100 may generate an advertisement target inference model, based on the generated labels and the generated feature vectors.

The advertisement target determining device 100 may obtain a score of each of the plurality of devices 200 by applying each of the plurality of devices 200 to the generated advertisement target device inference model.

The advertisement target determining device 100 may filter the plurality of devices 200 ranked in the order of high scores according to the advertisement condition to exclude the devices manufactured before the year 2018 from the advertisement target. The advertisement target determining device 100 may determine 1 million devices with high scores as the advertisement targets, based on the scores, while the devices manufactured before the year 2018 are excluded as advertisement targets.

An operation method of an advertisement target determining device according to an embodiment can be embodied as a computer-readable medium including instruction codes executable by a computer such as a program module executed by the computer. The computer-readable medium can be any available medium which can be accessed by the computer and includes all volatile/non-volatile and removable/non-removable media. The computer-readable medium may include program commands, data files, data structures, and the like separately or in combinations. The program commands to be recorded on the computer-readable medium may be specially designed and configured for the disclosure or may be well-known to and usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands may include advanced language codes that can be executed by a computer by using an interpreter or the like as well as machine language codes made by a compiler.

Although the one or more embodiments have been disclosed for illustrative purposes, one of ordinary skill in the art will appreciate that diverse variations and modifications are possible, without departing from the spirit and scope of the disclosure. Thus, the above embodiments should be understood not to be restrictive but to be illustrative, in all aspects. For example, each component described as a single type may be implemented in a distributed manner, and similarly, components described as being distributed may be implemented in a combined form.

What is claimed is:

1. A method of determining an advertisement target according to an advertisement request, the method comprising:
obtaining usage history information from a first plurality of devices via transmission from a communication interface of a device of the first plurality of devices;
obtaining a first plurality of features of the first plurality of devices, based on the usage history information;
generating a plurality of feature vectors for the first plurality of features;
determining a first plurality of labels for the first plurality of devices, based on the advertisement request and the first plurality of features by:
extracting a second plurality of devices that have achieved an advertisement purpose with respect to an advertisement object included in the advertisement request from among the first plurality of devices, based on the usage history information;

determining a second plurality of labels of the second plurality of devices as a first value;

extracting a third plurality of devices from among the first plurality of devices for which labels have not been determined with a third plurality of features that are similar to a second plurality of features the second plurality of devices;

training a neural network model comprising a plurality of lavers and a first plurality of weights by:

providing the neural network model the advertise request and the first plurality of features as a plurality of input values; and determining a second plurality of weights by optimizing a cost value of the first plurality of weights;

outputting the second plurality of weights of the first plurality of features;

determining one or more third labels of the third plurality of devices as the first value based on the third plurality of features and the second plurality of weights; and determining one or more fourth labels of the third plurality of devices for which the labels have not been determined as a second value;

generating an advertisement target inference model, based on the first plurality of labels and the plurality of feature vectors; and determining at least one advertisement target device among the first plurality of devices by applying the generated advertisement target inference model to the first plurality of devices.

2. The method of claim 1, wherein the neural network model is trained using a plurality of priorities of the first plurality of features, and the plurality of priorities are determined through experimentation.

3. The method of claim 1, wherein the first plurality of features comprise at least one of information about a device user including age, gender, region and income information, advertisement viewing information, advertisement click information, application usage information, external device usage information, television (TV) viewing information, video on demand (VOD) viewing information, application installation and removal information, device usage pattern information, or played game information.

4. The method of claim 1, wherein the advertisement request comprises an advertisement sector, the advertisement object, and the advertisement purpose.

5. The method of claim 1, wherein the generating of the advertisement target inference model comprises generating the advertisement target inference model by using a neural network trained to generate the advertisement target inference model from the first plurality of labels and the plurality of feature vectors.

6. The method of claim 1, wherein the determining of the at least one advertisement target device comprises:

obtaining a score by applying the generated advertisement target inference model to the first plurality of devices; and determining, as the advertisement target, at least one device with the score equal to or greater than a preset value among the first plurality of devices, based on the obtained score.

7. The method of claim 6, further comprising determining the at least one advertisement target device by filtering the determined at least one advertisement target device, based on an advertisement condition that is included in the advertisement request.

8. The method of claim 1, wherein the obtaining of the usage history information from the first plurality of devices comprises refining the usage history information by applying a square root or logarithm.

9. An advertisement target determining device for determining an advertisement target according to an advertisement request, the advertisement target determining device comprising:

a memory that stores one or more instructions; and a processor configured to execute the one or more instructions that are stored in the memory, to cause the processor to:

obtain usage history information from a first plurality of devices via transmission from a communication interface of a device of the first plurality of devices;

obtain a first plurality of features of the first plurality of devices, based on the usage history information;

generate a plurality of feature vectors for the first plurality of features;

determine a first plurality of labels for the first plurality of devices, based on the advertisement request and the first plurality of features by:

extracting a second plurality of devices that have achieved an advertisement purpose with respect to an advertisement object included in the advertisement request from among the first plurality of devices, based on the usage history information;

determining a second plurality of labels of the second plurality of devices as a first value;

extracting a third plurality of devices from among the first plurality of devices for which labels have not been determined with a third plurality of features that are similar to a second plurality of features the second plurality of devices;

training a neural network model comprising a plurality of lavers and a first plurality of weights by:

providing the neural network model the advertisement request and the first plurality of features as a plurality of input values; and determining a second plurality of weights by optimizing a cost value of the first plurality of weights;

outputting the second plurality of weights of the first plurality of features;

determining one or more third labels of the third plurality of devices as the first value based on the third plurality of features and the second plurality of weights; and determining one or more fourth labels of the third plurality of devices for which the labels have not been determined as a second value;

generate an advertisement target inference model, based on the first plurality of labels and the plurality of feature vectors; and determine at least one advertisement target device among the first plurality of devices by applying the generated advertisement target inference model to the first plurality of devices.

10. The advertisement target determining device of claim 9, wherein the neural network model is trained using a plurality of priorities of the first plurality of features, and the plurality of priorities are determined through experimentation.

11. The advertisement target determining device of claim 9, wherein the first plurality of features comprise at least one of information about a device user including age, gender, region and income information, advertisement viewing information, advertisement click information, application usage information, external device usage information, television (TV) viewing information, video on demand (VOD) viewing information, application installation and removal information, device usage pattern information, or played game information.

12. The advertisement target determining device of claim 9, wherein the advertisement request comprises an advertisement sector, the advertisement object, and the advertisement purpose.

13. The advertisement target determining device of claim 9, wherein the processor is further configured to execute the one or more instructions to generate the advertisement target inference model by using a neural network trained to generate the advertisement target inference model from the first plurality of labels and the plurality of feature vectors.

14. The advertisement target determining device of claim 9, wherein the processor is further configured to execute the one or more instructions to:
  obtain a score by applying the advertisement target inference model to the first plurality of devices; and
  determine, as the advertisement target, at least one device having the score equal to or greater than a preset value among the first plurality of devices, based on the obtained score.

15. The advertisement target determining device of claim 14, wherein the processor is further configured to execute the one or more instructions to determine the at least one advertisement target device by filtering the determined at least one advertisement target device, based on an advertisement condition that is included in the advertisement request.

16. A non-transitory computer-readable recording medium having recorded thereon instructions executable by at least one processor to perform a method for determining an advertisement target, the method comprising:
  obtaining usage history information from a first plurality of devices via transmission from a communication interface of a device of the first plurality of devices;
  obtaining a first plurality of features of the first plurality of devices, based on the usage history information;
  generating a plurality of feature vectors for the first plurality of features;
  determining a first plurality of labels for the first plurality of devices, based on an advertisement request and the plurality of features by:
    extracting a second plurality of devices that have achieved an advertisement purpose with respect to an advertisement object included in the advertisement request from among the first plurality of devices, based on the usage history information;
    determining a second plurality of labels of the second plurality of devices as a first value;
    extracting a third plurality of devices from among the first plurality of devices for which labels have not been determined with a third plurality of features that are similar to a second plurality of features the second plurality of devices;
    training a neural network model comprising a plurality of layers and a first plurality of weights by:
      providing the neural network model the advertisement request and the first plurality of features as a plurality of input values; and
      determining a second plurality of weights by optimizing a cost value of the first plurality of weights;
      outputting the second plurality of weights of the first plurality of features;
    determining one or more third labels of the third plurality of devices as the first value based on the third plurality of features and the second plurality of weights; and
    determining one or more fourth labels of the third plurality of devices for which the labels have not been determined as a second value;
  generating an advertisement target inference model, based on the first plurality of labels and the plurality of feature vectors; and
  determining at least one advertisement target device among the first plurality of devices by applying the generated advertisement target inference model to the first plurality of devices.

\* \* \* \* \*